US012473889B2

(12) United States Patent
Petersen et al.

(10) Patent No.: US 12,473,889 B2
(45) Date of Patent: Nov. 18, 2025

(54) WIND PARK POWER OSCILLATION CONTROL

(71) Applicant: VESTAS WIND SYSTEMS A/S, Aarhus N (DK)

(72) Inventors: Lennart Petersen, Skødstrup (DK); Germán Claudio Tarnowski, Aarhus N (DK); Poul Brandt Christensen, Ry (DK); Mark Faber, Risskov (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 52 days.

(21) Appl. No.: 18/566,574

(22) PCT Filed: Jun. 1, 2022

(86) PCT No.: PCT/DK2022/050117
§ 371 (c)(1),
(2) Date: Dec. 1, 2023

(87) PCT Pub. No.: WO2022/253396
PCT Pub. Date: Dec. 8, 2022

(65) Prior Publication Data
US 2024/0247639 A1    Jul. 25, 2024

(30) Foreign Application Priority Data

Jun. 3, 2021  (DK) .............................. PA202170288

(51) Int. Cl.
*F03D 7/04* (2006.01)
*F03D 7/02* (2006.01)
(Continued)

(52) U.S. Cl.
CPC ......... *F03D 7/0284* (2013.01); *F03D 7/0302* (2023.08); *F03D 7/048* (2013.01);
(Continued)

(58) Field of Classification Search
CPC ...... F03D 7/028; F03D 7/0284; F03D 7/0296; F03D 7/0298; F03D 7/0302; F03D 7/042;
(Continued)

(56) References Cited

U.S. PATENT DOCUMENTS 9,478,987 B2 * 10/2016 Nelson .................... H02J 3/241
10,907,613 B2    2/2021 Deng et al.
(Continued)

FOREIGN PATENT DOCUMENTS

EP    3779180 A1    2/2021
EP    3779183 A1    2/2021

OTHER PUBLICATIONS

PCT International Search Report and Written Opinion of the International Searching Authority for Application PCT/DK2022/050117 dated May 9, 2022.
(Continued)

*Primary Examiner* — Levi Gannon
(74) *Attorney, Agent, or Firm* — Patterson + Sheridan, LLP; Gero G. McClellan

(57) ABSTRACT

A method is provided for controlling power oscillations at a point of common coupling in a wind park. Individual power reference offsets defining an adjustment to a wind turbine power reference signal for counteracting mechanical oscillations in the respective wind turbines are received from respective wind turbine controllers. Based on an aggregated power reference offset, a total power oscillation compensation signal is determined. Individual power oscillation compensation signals for adjusting the wind turbine power reference signal of respective wind turbines are determined based on the individual power reference offsets and the total power oscillation compensation signal. These individual power oscillation compensation signals are then sent to the respective wind turbines.

20 Claims, 5 Drawing Sheets

(51) Int. Cl.
*H02J 3/24* (2006.01)
*H02K 7/18* (2006.01)

(52) U.S. Cl.
CPC ............... *H02J 3/24* (2013.01); *H02K 7/183* (2013.01); *F05B 2220/706* (2013.01); *F05B 2270/337* (2013.01)

(58) Field of Classification Search
CPC .......... F03D 7/043; F03D 7/047; F03D 7/048; F03D 9/255; F03D 9/257; F05B 2270/334; F05B 2270/335; F05B 2270/337; H02J 3/24; H02J 3/241; H02J 3/381; H02J 3/40; H02K 7/183
See application file for complete search history.

(56) References Cited

U.S. PATENT DOCUMENTS

| | | | |
|---|---|---|---|
| 12,116,982 B2 * | 10/2024 | Kleif | F03D 7/0284 |
| 2014/0232198 A1 * | 8/2014 | Garcia | F03D 7/0284 |
| | | | 290/44 |
| 2017/0226988 A1 | 8/2017 | Kjær et al. | |
| 2018/0363629 A1 * | 12/2018 | Kjær | F03D 7/048 |
| 2019/0338756 A1 * | 11/2019 | Jessen | F03D 7/028 |
| 2019/0383265 A1 * | 12/2019 | Hovgaard | F03D 9/007 |
| 2021/0033062 A1 * | 2/2021 | Mishra | F03D 7/048 |
| 2024/0301865 A1 * | 9/2024 | Hoffmann | F03D 7/0284 |

OTHER PUBLICATIONS

Danish Patent and Trademark Office, 1st Technical Examination including the Search Report and Search Opinion for Application PA 2021 70288 dated Dec. 10, 2021.

* cited by examiner

WIND PARK POWER OSCILLATION CONTROL

FIELD OF THE INVENTION

The invention relates to controlling operation of one or more wind turbines in a wind park and, in particular, to reducing reduce power oscillations in a point of common coupling.

BACKGROUND

Wind turbine control technology is used for optimisation of power and minimisation of loads. Many different loads act on a wind turbine, such as aerodynamic, gravity, centrifugal and inertial loads. Changes in the loads experienced by a wind turbine may be caused by wind conditions in the vicinity of the wind turbine, e.g., wind shear or turbulence, or may be caused by changing operation of the wind turbine, e.g., grid loss.

Wind turbine control approaches use a combination of collective and cyclic control, for instance controlling collective and individual pitch of the blades of the wind turbine or controlling torque or power output of its generator. Cyclic or individual pitch is used to control factors, such as lateral (side-side) tower damping, asymmetric rotor load control, and tower torsional dampening.

In addition to controlling the power output of and the loads acting on individual wind turbines, there is a need for controlling the operation of the wind park as a whole. Wind parks are commonly connected to a larger electrical grid at a point of common coupling (PCC). Network operators typically require a wind park to contribute to the stability of the larger electrical grid by controlling the total power output of the wind park in accordance with a set of rules prescribed by the network operator.

One common requirement for wind parks is to aim to keep power oscillations at the PCC below a certain level. In practice, this requirement may sometimes lead to conflicts with the urge of an individual wind turbine controller to modulate the wind turbine power output to, e.g., counteract mechanical oscillations. In, e.g., U.S. Pat. No. 10,907,613 B2, it is proposed to selectively enable or disable some damping control signals for wind turbines in the wind park to avoid the sum of the selected damping control signals exceeding a predetermined threshold.

It is against this background to which the present invention is set.

SUMMARY OF THE INVENTION

According to an aspect of the present invention there is provided a method of controlling power oscillations at a point of common coupling in a wind park comprising multiple wind turbines. The method comprises the steps of receiving individual power reference offsets from respective wind turbine controllers of the multiple wind turbines, determining an aggregated power reference offset and a total power oscillation compensation signal. Based thereon, individual power oscillation compensation signals are determined and sent to the respective wind turbine controllers. Each individual power reference offset defines an adjustment to a wind turbine power reference signal for counteracting mechanical oscillations in the respective wind turbines. The mechanical oscillations damped using the individual power reference offsets may, e.g., be drivetrain oscillations, side-side tower oscillations, or fore-aft tower oscillations. The aggregated power reference offset is determined based on the individual power reference offsets. The total power oscillation compensation signal is determined based on the aggregated power reference offset. Based on the individual power reference offsets and the total power oscillation compensation signal, the individual power oscillation compensation signals are determined. The individual power oscillation compensation signals are suitable for adjusting the wind turbine power reference signals of the respective wind turbines in such a way that the power oscillations at the PCC are kept low while maintaining the ability to modulate the wind turbine power output to, e.g., counteract mechanical oscillations.

It is an advantage of the method according to the invention that it can be implemented with minimal adjustment to the general operation and control of the individual wind turbines. All power control and oscillation damping algorithms of the individual wind turbines can continue to operate as before. For example, the respective wind turbine controller may simply add the individual power oscillation compensation signals, generated in accordance with the present invention, to the individual power reference offset or to the wind turbine power reference signal. Alternatively, a central wind park controller may use the individual power oscillation compensation signals to adjust the wind turbine power reference signals before they are sent to the respective wind turbine controllers.

A further important advantage of the method according to the invention is that it allows the central wind park controller to select which wind turbines to involve in the wind park power oscillation control scheme. For example, wind turbines that do not experience much mechanical oscillation may be selected to play a larger role in damping the wind park power oscillations than wind turbines that do. According to different embodiments of the invention, different algorithms are proposed to decide how much each wind turbine in the wind park is to contribute to the desired reduction of the wind park power oscillation.

In an embodiment of the invention, the step of determining the individual power oscillation compensation signals comprises assigning a weighting factor to each wind turbine based on the respective individual power reference offset and determining the individual power oscillation compensation signal based on the weighting factor and the total power oscillation compensation signal.

The weighting factors may, for example, just be 1 for wind turbines that are expected to participate in the wind park power oscillation control and 0 for wind turbines that are not. Preferably the weighting factors are normalised, such that the sum of the weighting factors for all wind turbines is 1 and each participating wind turbine is assigned an equal portion of the total power oscillation compensation signal.

Alternatively, some wind turbines are expected to contribute more than others. In that event, weighting factors may be assigned that are proportional to the expected contribution. Again, the weighting factors are preferably normalised, such that the total contribution of all wind turbines equals the total power oscillation signal.

In embodiments of the invention, the weighting factors are determined based on at least one of:
 a phase difference between the individual power reference offset and the total power oscillation compensation signal,
 an amplitude of the individual power reference offset,
 a predetermined maximum power modulation amplitude of the respective wind turbine, and a mechanical load history of the respective wind turbine.

All such criteria can be used to take into account the need of each wind turbine to adjust the wind turbine power reference signal for counteracting mechanical oscillations. For example, wind turbines that require the most damping of mechanical oscillations, may be assigned the lowest weighting factors. The same criteria may further be used to determine which wind turbines can contribute the most to the total power oscillation compensation without, e.g., introducing new and unacceptable mechanical oscillations or exceeding maximum power output thresholds.

In an embodiment, the weighting factor is non-zero only for wind turbines for which the amplitude of the individual power reference offset is below an activation threshold. The activation threshold may be zero. In this embodiment, wind turbines that already adjust the wind turbine power reference signal by adding a substantial (i.e. above the activation threshold) power reference offset do not have to take part in the central power oscillation compensation. Instead, the wind turbines that require the least adjustment of their wind turbine power reference signals to compensate for unwanted mechanical oscillations are used for counteracting power oscillations at the PCC.

Optionally, the weighting factor is non-zero for each wind turbine for which the amplitude of the individual power reference offset is below an activation threshold, and the step of determining the individual power oscillation compensation signals comprises:

determining the individual power oscillation compensation signal for each wind turbine for which the amplitude of the individual power reference offset is below the activation threshold, and if a sum of the individual power oscillation compensation signals for all wind turbines for which the amplitude of the individual power reference offset is below the activation threshold is below the total power oscillation compensation signal, assigning non-zero weighting factors to wind turbines for which the amplitude of the individual power reference offset is above the activation threshold.

This way, the wind turbines that require the least adjustment of their wind turbine power reference signals to compensate for unwanted mechanical oscillations are, again, used for counteracting power oscillations at the PCC. However, if it turns out that there are not enough wind turbines with so little mechanical oscillations that, together, they can compensate for all the unwanted power oscillations at the PCC, then one or more of the wind turbines with a larger individual power reference offset (i.e. more than the activation threshold) will be used too.

In an embodiment, the step of determining the total power oscillation compensation signal comprises deducting an oscillation amplitude threshold from the aggregated power reference offset, the oscillation amplitude threshold representing a predetermined maximum acceptable total power adjustment for counteracting mechanical oscillations in the wind turbines of the wind park. When the oscillation amplitude threshold is set to zero, the control algorithm will aim to counteract all power oscillations at the PCC. When the oscillation amplitude threshold is set to a value above zero, some power oscillations at the PCC are accepted, but all oscillations in excess thereof are compensated for.

The step of determining the total power oscillation compensation signal may include time shifting the aggregated power reference offset. Due to the periodic nature of the mechanical oscillations, also the individual power reference offsets and the aggregated power reference offset will be periodic signals. When applying a 180 degrees phase shift to the aggregated power reference offset, a periodic compensation signal is obtained that can counteract the power oscillations caused by the damping of mechanical oscillations.

In a special embodiment, it is possible to temporarily attenuate the total power oscillation compensation signal. For example, the attenuation may be initiated by resetting a timer of a time-dependent attenuation function. The time-dependent attenuation function then gradually or stepwise evolves from a maximum attenuation factor to a minimum attenuation factor. The result of such attenuation is that the power oscillation compensation is temporarily disabled or damped. This may, e.g., be useful when sudden mechanical or electrical changes to the wind turbines, the wind park, or the external grid occur, and other control algorithms may get a higher priority. With a time-dependent attenuation function, the power oscillation control method can gradually retain its controlling power and a new stable situation will be reached.

According to a further aspect of the invention, a controller is provided for controlling operation of multiple wind turbines in a wind park. The controller is operatively coupled to respective wind turbine controllers of the multiple wind turbines and configured to perform a method as described above.

According to yet another aspect of the invention, a computer program is provided comprising instructions which, when executed by a computer cause the computer to carry out such a method.

BRIEF DESCRIPTION OF THE DRAWINGS

Examples of the invention will now be described with reference to the accompanying figures, in which.

DETAILED DESCRIPTION

Figure 1:
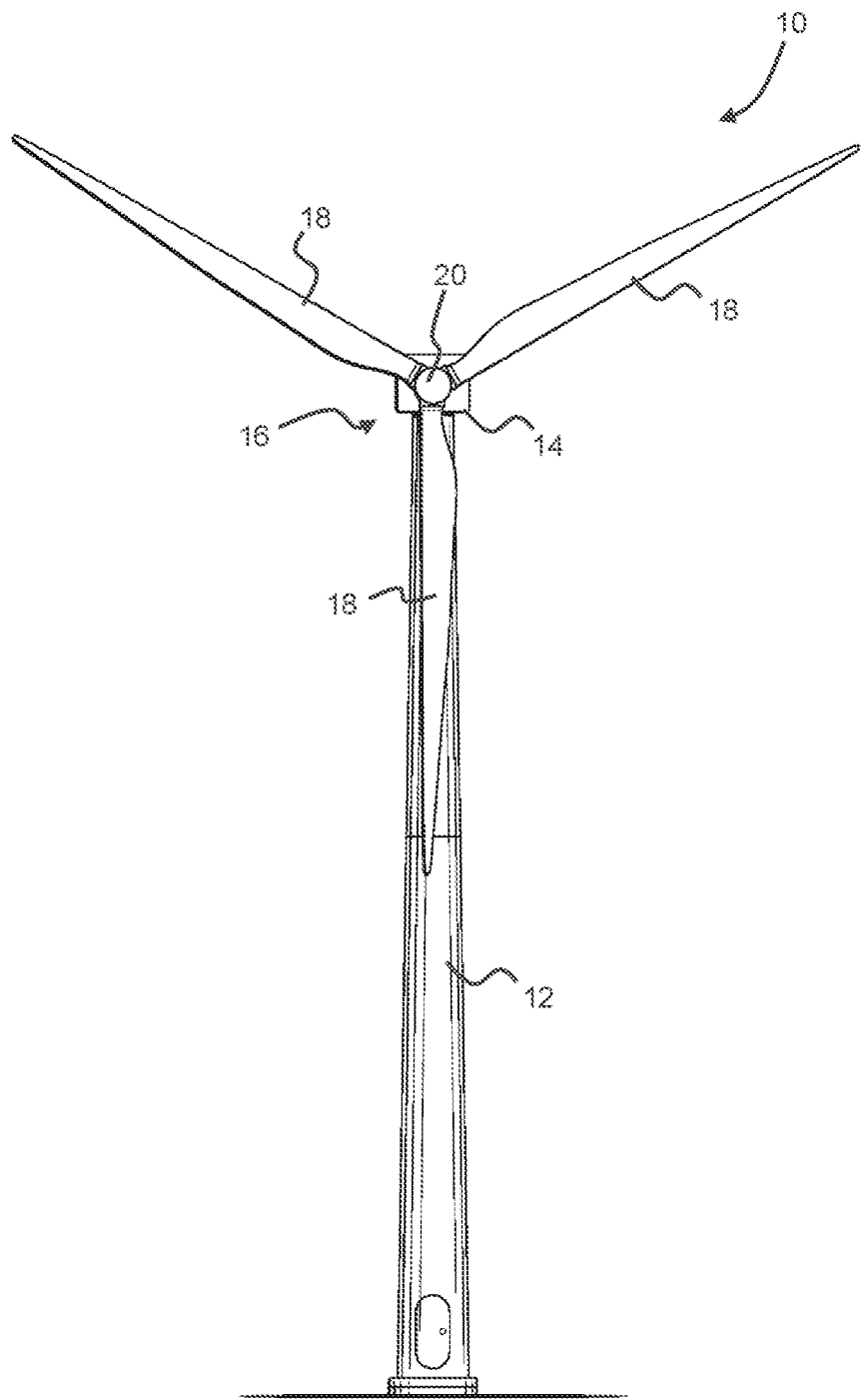
FIG. 1 is a schematic diagram of a wind turbine according to an example of the invention.

FIG. 1 shows a wind turbine 10 in which an example of the invention may be incorporated. The wind turbine 10 comprises a tower 12 supporting a nacelle 14 to which a rotor 16 is mounted. The rotor 16 comprises a plurality of wind turbine blades 18 that extend radially from a hub 20. In this example, the rotor 16 comprises three blades 18 and wind turbine 10 a single rotor 16, although other configurations including any suitable number of blades and rotors are possible.

Figure 2:
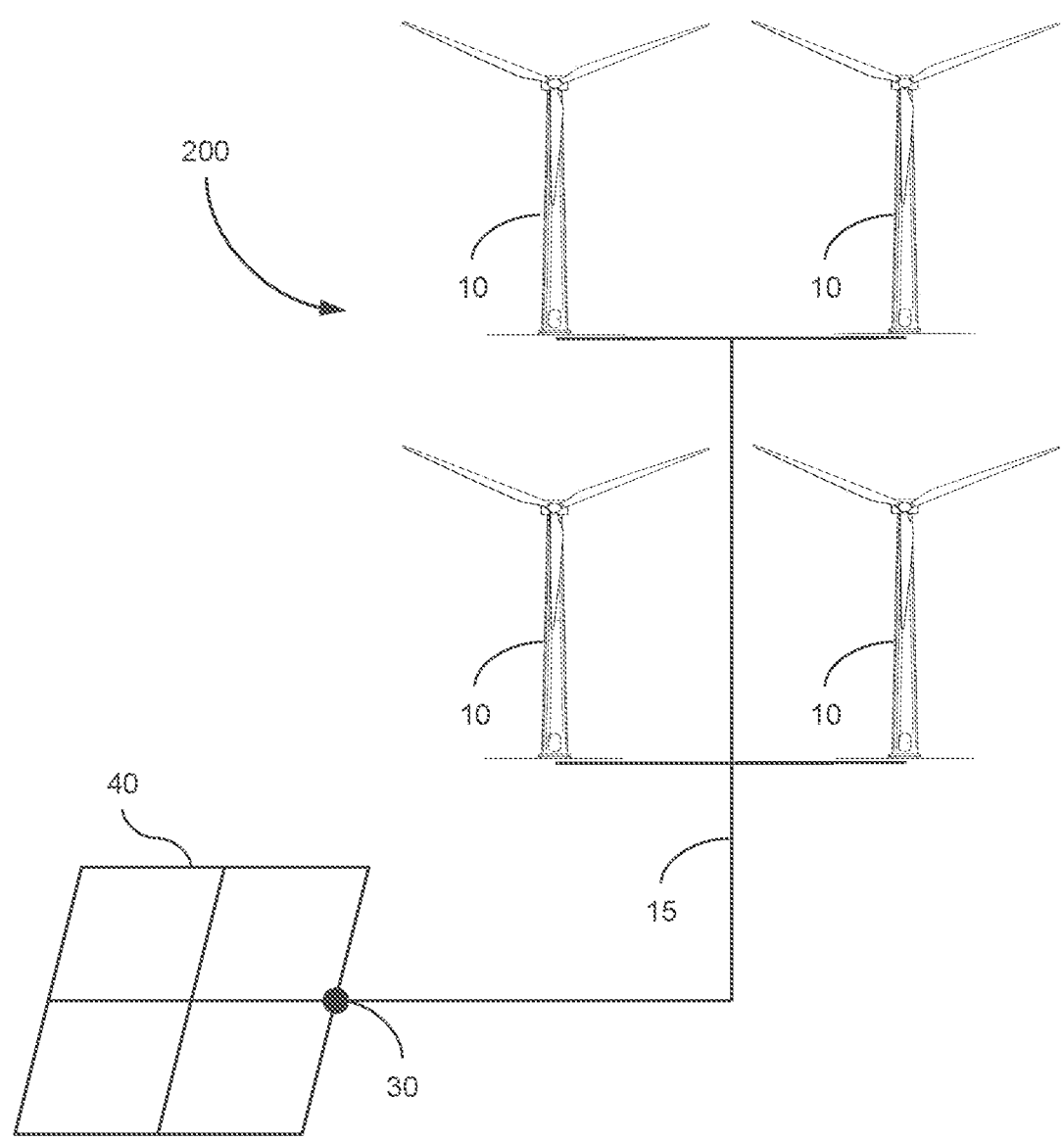
FIG. 2 is a schematic diagram of a wind park according to an example of the invention.

FIG. 2 is a schematic diagram of a wind park 200 according to an example of the invention. For illustrative purposes only, the wind park 200 of FIG. 2 comprises four wind turbines 10. In practice, the wind park 200 may comprise tens or hundreds of wind turbines 10. All wind turbines 10 are coupled to a common power line 15 that connects with an external electrical grid 40 at a point of common coupling (PCC) 30.

Figure 3:
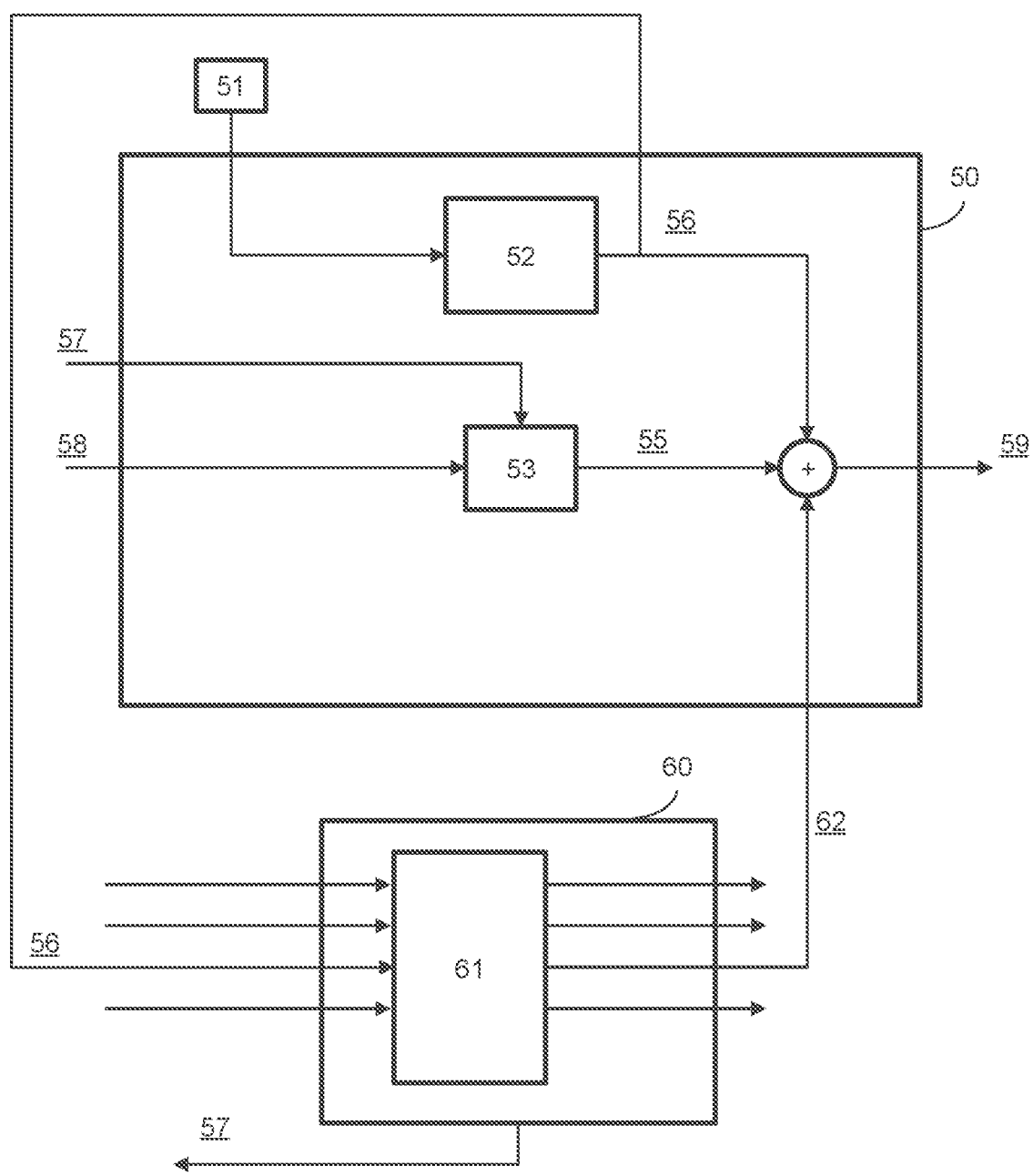
FIG. 3 is a schematic diagram of a wind turbine controller and a wind park controller for use in the wind park of FIG. 2.

During operation, each individual wind turbine 10 is controlled by a wind turbine controller 50 that is in communication with a central wind park controller 60 for coordinating the operation of all the individual wind turbines 10 in the wind park 200. FIG. 3 is a schematic diagram of one wind turbine controller 50 and a wind park controller 60 for use in the wind park 200 of FIG. 2.

Each wind turbine 10 is controlled by its wind turbine controller 50 to adjust its operation and control its output power based on a combination of local sensor data and central commands from the wind park controller 60. For example, a PPC (power plant controller) active power reference 57 may be sent from the wind park controller 60 to the wind turbine controller 50 to request the wind turbine 10 to deliver a set amount of power. Wind speed information 58 may be provided by wind speed sensors on the wind turbine 10 itself, wind speed sensors provided in the wind park 200, by the wind park controller 60. The amount of power a wind turbine 10 is able to deliver depends on the wind speed 58. A load controller 53 may use the PPC active power reference 57, the wind speed and/or additional information to determine a wind turbine power reference signal 55 that is used to control the operation of the wind turbine 10 (blade pitch, rotor yaw, generator speed, . . . ) in such a way that it delivers the desired amount of power.

One or more accelerometers 51 may be used for monitoring mechanical oscillations in the wind turbine. Examples of such oscillations are fore-aft tower oscillations, side-side tower oscillations, or drivetrain oscillations. To counteract such mechanical oscillations, an oscillation damper controller 52 may process the input from the one or more accelerometers 51 and determine a power reference offset 56. The power reference offset 56 defines an adjustment to the wind turbine power reference signal 55 coming from the load controller 53 for the purpose of counteracting the mechanical oscillations. An adjusted wind turbine power reference signal 59 is then used for controlling the operation of the wind turbine 10. The power reference offset 56 will typically be a periodic signal with a frequency that matches the mechanical oscillations that are to be damped. The amplitude and the phase of the power reference offset 56 are selected such that they add a variation to the torque produced by the generator that will partly or fully cancel out the mechanical oscillation.

Every wind turbine 10 in the wind park 200 may have a similar or identical wind turbine controller 50 with an oscillation damper controller 52 for adding a power reference offset 56 to the wind turbine power reference signal 55. While the oscillation damping algorithms employed by such oscillation damper controllers 52 have shown to be very effective in, e.g., side-side tower damping (SSTD), the combined effect of the adjustments of wind turbine power reference signals 55 may lead to periodic variations in the power supplied to the external grid 40 at the PCC 30. For ensuring that such power oscillations remain under an oscillation amplitude threshold (e.g. +/−0.5% of nominal wind park power), the wind park controller 60 comprises a power oscillation compensator 61. According to the invention, the power reference offsets 56 from the oscillation damper controllers 52 of the wind turbines 10 in the wind park 200 are provided as input for this power oscillation compensator 61. A special power oscillation compensation algorithm that will be described in more detail below with reference to FIGS. 4 and 5 determines, based on the received power reference offsets 56, individual power oscillation compensation signals 62 for all of the wind turbines 10.

The individual power oscillation compensation signals are then used to further adjust the wind turbine power reference signal 55 that controls the operation of the wind turbine 10. This additional adjustment may, as shown in FIG. 3, be realised by adding the individual power oscillation compensation signal 62 to the output 55 of the load controller 53. Alternatively, the individual power oscillation compensation signal is used to adapt the PPC active power reference 57 before it is sent to the wind turbine controller 50. By using this power oscillation compensator 61, the power oscillations at the PCC 30 are kept low while maintaining the ability to modulate the wind turbine power output to counteract the mechanical oscillations.

Figure 4:
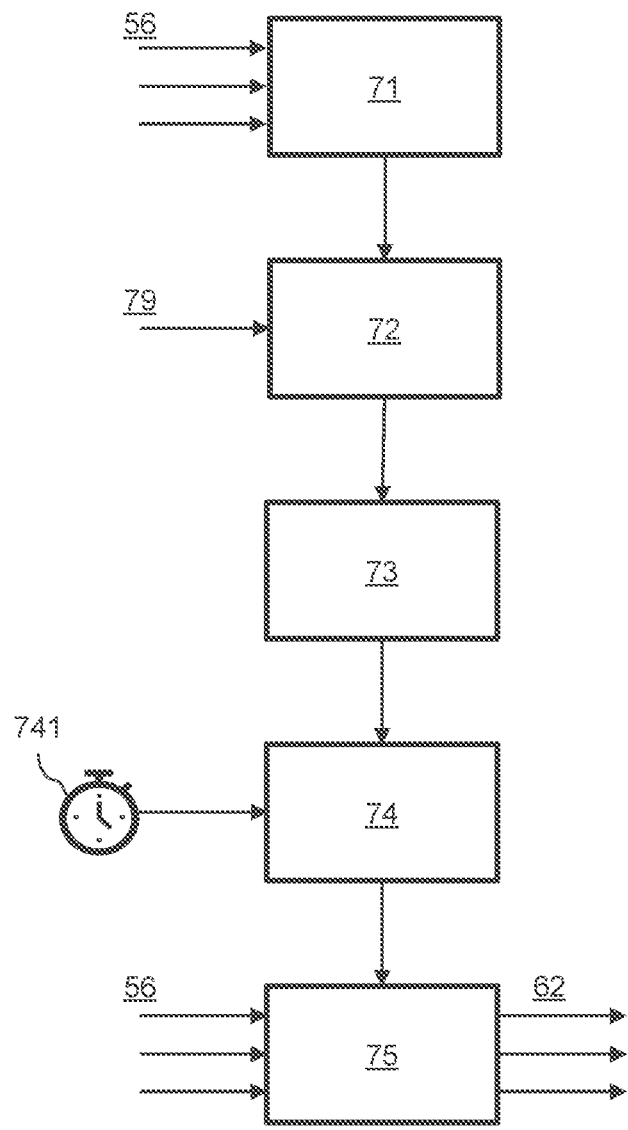
FIG. 4 is a flow diagram of a power oscillation compensation algorithm for use in an embodiment of the invention.

FIG. 4 is a flow diagram of a power oscillation compensation algorithm for use in an embodiment of the invention. The algorithm as it will be discussed from here on will be aimed at compensation for power oscillations occurring at the PCC 30 and caused by SSTD control in the individual wind turbines 10. The same or similar power oscillation compensation algorithms are, however, equally useful for compensation for power oscillations occurring due to the damping of other types of mechanical oscillations.

Figure 5:
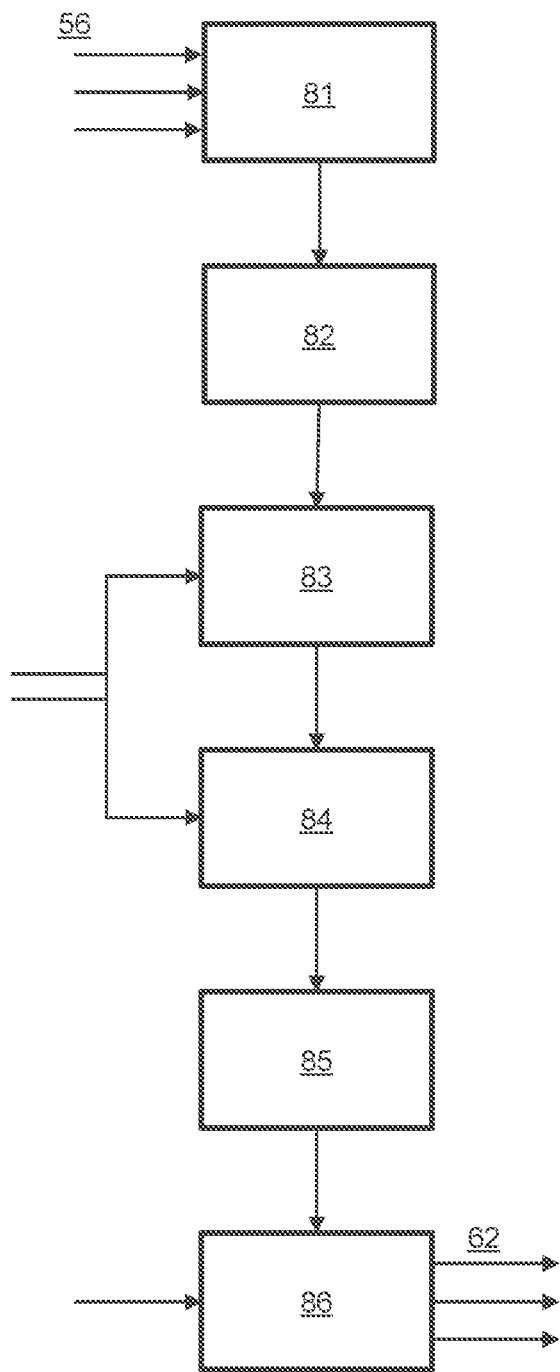
FIG. 5 is a flow diagram of a weighting algorithm for use in an embodiment of the invention.

The power oscillation compensation algorithm of FIGS. 4 and 5 is executed by the power oscillation compensator 61 of the wind park controller 60 but may in general be implemented in a different computing entity. The algorithm starts with a first step 71 of receiving and aggregating the individual power reference offsets 56 generated by the oscillation damper controllers 52 of the respective wind turbines 10. Because the wind turbines 10 in a wind park 200 are generally of a similar type and operate under similar conditions, their side-side tower oscillations are typically of the same frequency (e.g. 0.2 Hz) and typically only differ in their phase and amplitude. The individual power reference offsets 56 used for compensating for these mechanical oscillations will have the same frequency. Due to the phase differences, some of the individual power reference offsets 56 may cancel each other out, while other power reference offsets 56 enhance each other. The aggregated power reference offset is a periodic signal representing the resulting unwanted power oscillations at the PCC 30. In an embodiment, the aggregated power reference is the sum of the individual power reference offsets 56.

In an optional second step 72, the aggregated power reference offset may be compared to an oscillation amplitude threshold 79. The oscillation amplitude threshold 79 defines a maximum amount of power oscillation at the PCC that may be considered acceptable. The oscillation amplitude threshold 79 may, e.g. be +/−0.5% or 1.0% of nominal wind park power. If the amplitude of the aggregated power reference offset keeps below the oscillation amplitude threshold 79, no power oscillation compensation may be needed. If the amplitude of the aggregated power reference offset exceeds the oscillation amplitude threshold 79, the excess amplitude is compensated for and is passed on to the subsequent stage of the power oscillation compensation algorithm.

The height of this oscillation amplitude threshold 79 may be determined based on technical requirements prescribed by a network operator. While, in general, complete compensation of all power oscillations may be desired (threshold=0.0%), some power oscillation may be accepted to limit interference with the mechanical oscillation damping in the individual wind turbines 10. When the oscillation amplitude threshold 79 is set to 0.0%, the full aggregated power reference offset is compensated for and this second step 72 is effectively skipped.

In a third step 73, the aggregated power reference offset signal is converted to a total power oscillation compensation signal, e.g. using a lead-lag compensator. One step in this conversion process may involve a 180 degrees phase shift of the input signal, resulting in a periodic signal that is in counterphase with the power oscillations that are to be expected at the PCC 30.

In an optional fourth step 74, the total power oscillation compensation signal may be temporarily attenuated on request. For example, the attenuation may be initiated by resetting a timer 741 of a time-dependent attenuation function. The time-dependent attenuation function then gradually or stepwise evolves from a maximum attenuation factor to a minimum attenuation factor. The result of such attenuation is that the power oscillation compensation is temporarily disabled or damped. This may, e.g., be useful when sudden mechanical or electrical changes to the wind turbines 10, the wind park 200, or the external grid 40 occur, and other control algorithms may get a higher priority. With a time-dependent attenuation function, the power oscillation control method can gradually retain its controlling power and a new stable situation will be reached. One of many examples of such a time dependent attenuation function is $f(t)=1-e^{-\lambda t}$, wherein A is a decay rate that defines how quickly the attenuation will be reduced from 100% to about 0%.

It is noted that the attenuation step 74 is an optional addition to the power oscillation algorithm executed by the power oscillation compensator 61. In addition to a reset function, the timer 741 may comprise an enable/disable function for completely disabling this optional functionality. It is further noted that this fourth step 74 may be moved forward and performed before the third step 73. Similarly, other steps of this power oscillation compensation algorithm may be performed in a different order than presented here.

In a final fifth step 75 of this power oscillation compensation algorithm, the total power oscillation compensation signal fed into a dispatcher that selects which individual wind turbines 10 are expected to contribute to the power oscillation compensation scheme. Typically, this step will involve determining individual power oscillation compensation signals for some or all of the wind turbines 10, the individual power oscillation compensation signals 62 together adding up to the total power oscillation compensation signal originating from the third or fourth step 73, 74 of the power oscillation compensation algorithm.

In a simple form, the dispatcher may just assign equal weight to all wind turbines 10 and divide the total power oscillation compensation signal by the number of participating wind turbines 10 in order to obtain a set of identical individual power oscillation compensation signals. Alternatively, the dispatcher decides to let only a subset of the wind turbines 10 in the wind park 200 participate in the power oscillation compensation scheme and distributes the total power oscillation compensation signal over the selected subset of wind turbines 10 only. The selected wind turbines 10 may then either all contribute equally, or may each be assigned different individual weighting factors.

FIG. 5 shows a flow diagram of a possible weighting algorithm that may be used in the fifth step 75 of the power oscillation compensating method of FIG. 4. Using the algorithm of FIG. 5, a weighting factor may be assigned to each wind turbine 10 based on the respective individual power reference offsets 56 received at the input of the first step 81. Individual power oscillation compensation signals 62 are then determined based on the weighting factor and the total power oscillation compensation signal, and finally provided at the output of the sixth step 86 for communication to the individual wind turbines 10.

In the first step 81 of this possible weighting algorithm, the individual power reference offsets 56 are received from all the participating wind turbines 10. One or more complete oscillation periods of these signals (5.0 seconds in the event of oscillations at a frequency of 0.2 Hz) may be stored in a memory buffer for further processing in the subsequent steps of this algorithm. Preferably, the memory buffer is continuously updated to always contain the most recent individual power reference offsets 56. Alternatively, for example to save some processing power, the memory buffer is only updated periodically.

In a second step 82, for each of the buffered individual power reference offsets 56, the amplitude and phase are determined. The amplitude of the individual power reference offsets 56 is a clear measure for how much mechanical oscillation the individual wind turbine 10 needs to damp. In most circumstances, the wind turbines 10 that need to compensate for the most mechanical oscillations may be the least suitable to take a large part in the reduction of power oscillations at the PCC 30. A phase difference between the individual power reference offset 56 and the total power oscillation compensation signal may also be an important aspect in determining weights for the individual wind turbines 10. When the phase difference is small, the respective wind turbine 10 may be less affected by adding a portion of the total power oscillation compensation than when the individual power reference offset 56 is in counterphase with the total power oscillation signal.

In a third and fourth step 83, 84, the actual weights for each individual wind turbine 10 are determined based on the amplitude and phase as calculated in the previous step 82. Preferably, additional factors such as a maximum power modulation amplitude and/or a mechanical load history of the respective wind turbine 10 are taken into account too.

In the third step 83, weights are assigned to those wind turbines 10 for which the amplitude of the individual power reference offset 56 is zero or close to zero. Since the wind turbine power reference signals 55 for those wind turbines 10 do not already have to be adjusted by a substantial power modulation amplitude, and do not yet suffer from substantial mechanical oscillations, they can be used for power oscillation compensation at the PCC 30 without any detrimental effect on the damping of mechanical oscillations and without exceeding any limits for the amplitude of the power modulation.

If the weights assigned in the third step 83 together already add up to 100% of the total power oscillation compensation signal, the fourth step 84 for assigning weights to the remaining wind turbines 10 may be skipped. If not, then weights will be assigned to the remaining wind turbines 10 too. In this fourth step 84, highest priority may be given to the wind turbines 10 for which the phase difference between the individual power reference offset 56 and the total power oscillation compensation signal is small. If needed, also some of the wind turbines 10 for which the individual power reference offset 56 is in counterphase with the total power oscillation compensation signal may be assigned a non-zero weight.

In both the third and the fourth step 83, 84, weights for those wind turbines 10 with a recorded history of high mechanical load may be reduced in order to ensure that for those wind turbines 10 the damping of mechanical oscillations is prioritised over the compensation of power oscillations at the PCC 30.

In an optional fifth step 85, the weights assigned to all the different wind turbines 10 are normalised such that they add up to 1. Alternatively, the normalising already takes place while assigning the weights in the third and fourth step 83, 84.

In the table below, exemplary normalised weights that may result from the weighting algorithm described above are shown for a hypothetical wind park 200 comprising eight wind turbines 10. As can be seen in this table, the wind turbine WTG 8 has an individual power reference offset 56 with a very low amplitude and is thus expected to provide a larger contribution (0.54) to the power oscillation compensation at the PCC 30. Wind turbine WTG 5, with a high amplitude individual power reference being substantially in counterphase with the total power oscillation compensation signal, is assigned a very low (0) weight.

| WTG | 1 | 2 | 3 | 4 | 5 | 6 | 7 | 8 |
|---|---|---|---|---|---|---|---|---|
| weight | 0.16 | 0.01 | 0.01 | 0.01 | 0 | 0.09 | 0.17 | 0.54 |
| Δ phase | 33 | 154 | 154 | 157 | 177 | 79 | 39 | 53 |
| amplitude | 0.02 | 0.05 | 0.02 | 0.03 | 0.03 | 0.03 | 0.01 | 0 |

Finally, in a sixth and final step 86, the normalised individual weights and the total power oscillation compensation signal are used to calculate the individual power oscillation compensation signals 62 that are sent to the individual wind turbines 10 for further adjusting the wind turbine power reference signals 55 that control the operation of the respective wind turbines 10. This adjustment may, as shown in FIG. 3, be realised by adding the individual power oscillation compensation signal to the output of the load controller 53. Alternatively, the individual power oscillation compensation signal is used to adapt the PPC active power reference 57 before it is sent to the wind turbine controller 50. By using this power oscillation compensator 61, the power oscillations at the PCC 30 are kept low while maintaining the ability to modulate the wind turbine power output to counteract the mechanical oscillations.

The invention claimed is:

1. A method of controlling power oscillations at a point of common coupling in a wind park comprising multiple wind turbines, the method comprising:
   receiving, from respective wind turbine controllers of the multiple wind turbines, individual power reference offsets, each individual power reference offset defining an adjustment to a wind turbine power reference signal for counteracting mechanical oscillations in the respective wind turbines,
   based on the individual power reference offsets, determining an aggregated power reference offset,
   based on the aggregated power reference offset, determining a total power oscillation compensation signal,
   based on the individual power reference offsets and the total power oscillation compensation signal, determining individual power oscillation compensation signals for adjusting the wind turbine power reference signal of the respective wind turbines, and
   sending the individual power oscillation compensation signals to the wind turbine controllers of the respective wind turbines.

2. The method of controlling power oscillations as claimed in claim 1, wherein the determining the individual power oscillation compensation signals comprises assigning a weighting factor to each wind turbine based on the respective individual power reference offset and determining the individual power oscillation compensation signal based on the weighting factor and the total power oscillation compensation signal.

3. The method of controlling power oscillations as claimed in claim 2, wherein the weighting factor depends on at least one of:
   a phase difference between the individual power reference offset and the total power oscillation compensation signal,
   an amplitude of the individual power reference offset,
   a predetermined maximum power modulation amplitude of the respective wind turbine, and
   a mechanical load history of the respective wind turbine.

4. The method of controlling power oscillations as claimed in claim 3, wherein the weighting factor is non-zero only for wind turbines for which the amplitude of the individual power reference offset is below an activation threshold.

5. The method of controlling power oscillations as claimed in claim 3, wherein the weighting factor is non-zero for each wind turbine for which the amplitude of the individual power reference offset is below an activation threshold, and wherein the determining the individual power oscillation compensation signals comprises:
   determining the individual power oscillation compensation signal for each wind turbine for which the amplitude of the individual power reference offset is below the activation threshold, and
   if a sum of the individual power oscillation compensation signals for all wind turbines for which the amplitude of the individual power reference offset is below the activation threshold is below the total power oscillation compensation signal, assigning non-zero weighting factors to wind turbines for which the amplitude of the individual power reference offset is above the activation threshold.

6. The method of controlling power oscillations as claimed in claim 1, wherein the determining the total power oscillation compensation signal comprises deducting an oscillation amplitude threshold from the aggregated power reference offset, the oscillation amplitude threshold representing a predetermined maximum acceptable total power adjustment for counteracting mechanical oscillations in the wind turbines of the wind park.

7. The method of controlling power oscillations as claimed in claim 1, wherein the determining the total power oscillation compensation signal comprises time shifting the aggregated power reference offset.

8. The method of controlling power oscillations as claimed in claim 1, further comprising temporarily attenuating the total power oscillation compensation signal.

9. The method of controlling power oscillations as claimed in claim 8, wherein the temporarily attenuating the total power oscillation compensation signal comprises resetting a timer of a time-dependent attenuation function, the time-dependent attenuation function gradually or stepwise evolving from a maximum attenuation factor to a minimum attenuation factor.

10. The method of controlling power oscillations as claimed in claim 1, wherein the individual power reference offsets result from a side-side tower damping algorithm.

11. A controller for controlling power oscillations at a point of common coupling of multiple wind turbines in a wind park, the controller being operatively coupled to respective wind turbine controllers of the multiple wind turbines and configured to perform an operation, comprising:

receiving, from respective wind turbine controllers of the multiple wind turbines, individual power reference offsets, each individual power reference offset defining an adjustment to a wind turbine power reference signal for counteracting mechanical oscillations in the respective wind turbines, based on the individual power reference offsets, determining an aggregated power reference offset, based on the aggregated power reference offset, determining a total power oscillation compensation signal, based on the individual power reference offsets and the total power oscillation compensation signal, determining individual power oscillation compensation signals for adjusting the wind turbine power reference signal of the respective wind turbines, and sending the individual power oscillation compensation signals to the wind turbine controllers of the respective wind turbines.

12. The controller of claim 11, wherein the determining the individual power oscillation compensation signals comprises assigning a weighting factor to each wind turbine based on the respective individual power reference offset and determining the individual power oscillation compensation signal based on the weighting factor and the total power oscillation compensation signal.

13. The controller of claim 12, wherein the weighting factor depends on at least one of:
a phase difference between the individual power reference offset and the total power oscillation compensation signal,
an amplitude of the individual power reference offset,
a predetermined maximum power modulation amplitude of the respective wind turbine, and
a mechanical load history of the respective wind turbine.

14. The controller of claim 13, wherein the weighting factor is non-zero only for wind turbines for which the amplitude of the individual power reference offset is below an activation threshold.

15. The controller as claimed in claim 11, wherein the determining the total power oscillation compensation signal comprises time shifting the aggregated power reference offset.

16. A non-transitory computer readable medium storing instructions which, when executed by a computer, cause the computer to perform an operation for controlling power oscillations at a point of common coupling of multiple wind turbines in a wind park, the operation comprising:
receiving, from respective wind turbine controllers of the multiple wind turbines, individual power reference offsets, each individual power reference offset defining an adjustment to a wind turbine power reference signal for counteracting mechanical oscillations in the respective wind turbines, based on the individual power reference offsets, determining an aggregated power reference offset, based on the aggregated power reference offset, determining a total power oscillation compensation signal, based on the individual power reference offsets and the total power oscillation compensation signal, determining individual power oscillation compensation signals for adjusting the wind turbine power reference signal of the respective wind turbines, and sending the individual power oscillation compensation signals to the wind turbine controllers of the respective wind turbines.

17. The non-transitory computer readable medium of claim 16, wherein the determining the individual power oscillation compensation signals comprises assigning a weighting factor to each wind turbine based on the respective individual power reference offset and determining the individual power oscillation compensation signal based on the weighting factor and the total power oscillation compensation signal.

18. The non-transitory computer readable medium of claim 17, wherein the weighting factor depends on at least one of:
a phase difference between the individual power reference offset and the total power oscillation compensation signal,
an amplitude of the individual power reference offset,
a predetermined maximum power modulation amplitude of the respective wind turbine, and
a mechanical load history of the respective wind turbine.

19. The non-transitory computer readable medium of claim 18, wherein the weighting factor is non-zero only for wind turbines for which the amplitude of the individual power reference offset is below an activation threshold.

20. The non-transitory computer readable medium of claim 16, wherein the operation further comprises temporarily attenuating the total power oscillation compensation signal, and wherein the temporarily attenuating the total power oscillation compensation signal comprises resetting a timer of a time-dependent attenuation function, the time-dependent attenuation function gradually or stepwise evolving from a maximum attenuation factor to a minimum attenuation factor.

* * * * *